(12) United States Patent
Lesage et al.

(10) Patent No.: US 10,835,883 B2
(45) Date of Patent: Nov. 17, 2020

(54) CHARGE INJECTION DEVICE FOR AN FCC UNIT

(71) Applicant: Total Raffinage Chimie, Courbevoie (FR)

(72) Inventors: Romain Lesage, Antwerp (BE); Sebastien Decker, Octeville sur Mer (FR); Jean-Christophe Raboin, Chaumont sur Tharonne (FR); Youen Kerneur, Le Havre (FR)

(73) Assignee: Total Raffinage Chimie, Courbevoie (FR)

( * ) Notice: Subject to any disclaimer, the term of this patent is extended or adjusted under 35 U.S.C. 154(b) by 0 days.

(21) Appl. No.: 16/496,876

(22) PCT Filed: Mar. 22, 2018

(86) PCT No.: PCT/EP2018/057341
§ 371 (c)(1),
(2) Date: Sep. 23, 2019

(87) PCT Pub. No.: WO2018/172474
PCT Pub. Date: Sep. 27, 2018

(65) Prior Publication Data
US 2020/0101431 A1    Apr. 2, 2020

(30) Foreign Application Priority Data

Mar. 24, 2017 (FR) ..................... 17 52497

(51) Int. Cl.
*B01J 4/00* (2006.01)
*B01J 8/18* (2006.01)
(Continued)

(52) U.S. Cl.
CPC ............ *B01J 4/002* (2013.01); *B01J 8/1827* (2013.01); *B05B 7/0483* (2013.01); *C10G 11/18* (2013.01);
(Continued)

(58) Field of Classification Search
CPC ... B01J 4/002; B01J 4/005; B01J 19/26; B01J 8/1818; B01J 8/24; B01J 2208/00902;
(Continued)

(56) References Cited

U.S. PATENT DOCUMENTS 3,301,485 A * 1/1967 Tropeano .................. F25C 3/04
239/2.2
5,921,472 A 7/1999 Haruch
(Continued)

FOREIGN PATENT DOCUMENTS

WO       0114500 A1    3/2001
WO    2015073133 A1    5/2015

OTHER PUBLICATIONS

International Search Report issued in Application No. PCT/EP2018/057341, dated Jun. 14, 2018, 7 pages.
(Continued)

*Primary Examiner* — Lessanework Seifu
(74) *Attorney, Agent, or Firm* — Albert Shung

(57) ABSTRACT

The invention relates to an injection device (10) configured to atomize a liquid into droplets using a gas, comprising a hollow tubular body (12) of longitudinal direction (X). An internal wall (13) defines a first zone referred to as a contact zone (Z1) and a second zone (Z2). The device (10) is notably provided with an atomizing element (18) mounted on an opening (19) of the body situated facing an opening (17) for injecting a liquid, comprising a tubular pipe (20) for conveying gas into the first zone (Z1), and a target (21) situated at the centre of the pipe. The body has an internal cross-section that varies continuously or is constant over its entire length (for example the shape of a simple cylinder) and of which the internal wall is provided, between the zones (Z1) (Z2), with at least one chicane (26*i*, 26'*i*) projecting from the internal wall towards the inside of the body.

16 Claims, 3 Drawing Sheets

(51) Int. Cl.
*B05B 7/04* (2006.01)
*C10G 11/18* (2006.01)

(52) U.S. Cl.
CPC ............... *B01J 2204/005* (2013.01); *B01J 2208/00902* (2013.01)

(58) Field of Classification Search
CPC ... B05B 7/0483; B05B 7/0491; B05B 7/0416; B05B 7/0408
See application file for complete search history.

(56) References Cited

U.S. PATENT DOCUMENTS

| | | | |
|---|---|---|---|
| 6,596,242 B1 * | 7/2003 | Dries | B01J 8/008 422/139 |
| 2015/0024297 A1 | 1/2015 | Finnerty et al. | |
| 2016/0288075 A1 * | 10/2016 | Lacroix | B05B 1/044 |

OTHER PUBLICATIONS

Prashanta Dutta et al., "Effect of baffle size, perforation, and orientation on internal heat transfer enhancement" International Journal of Heat and Mass Transfer., (1998), vol. 41, No. 19, pp. 3005-3013.

\* cited by examiner

A-A

A-A

B-B

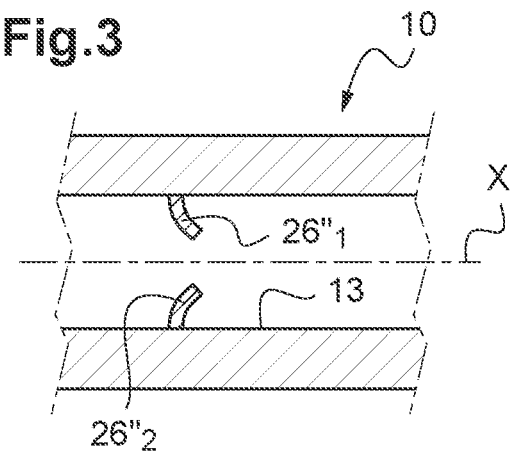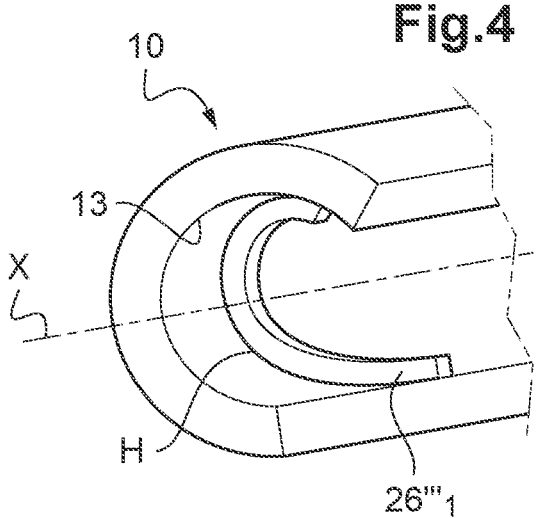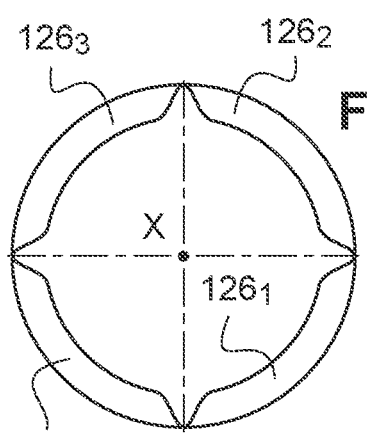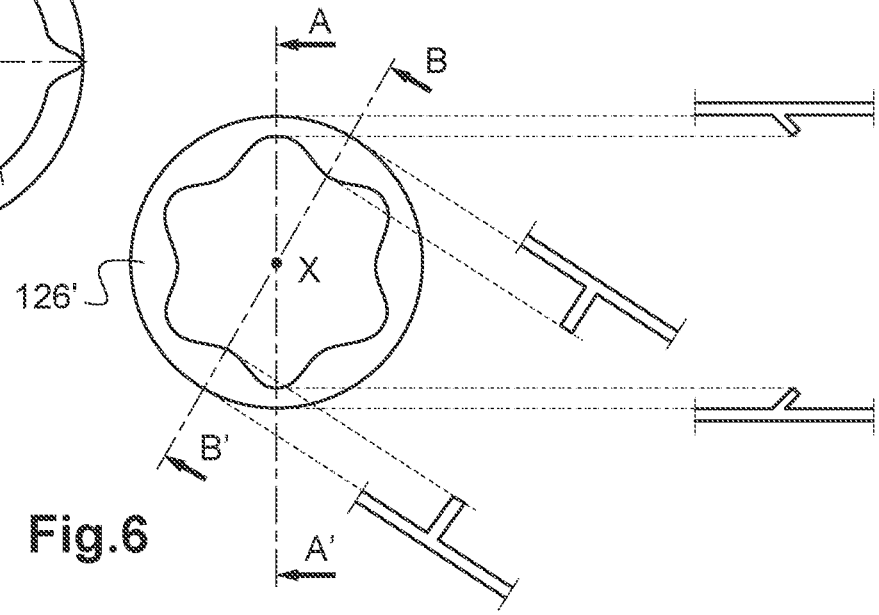

CHARGE INJECTION DEVICE FOR AN FCC UNIT

CROSS-REFERENCE TO RELATED APPLICATIONS

This application claims the benefit of PCT/EP2018/057341 filed Mar. 22, 2018, which claims priority from FR 1752497 filed Mar. 24, 2017, which are incorporated herein by reference in their entireties for all purposes.

The present invention relates to an injection device, notably to a hydrocarbon charge injection device for a refining unit, particularly a fluid catalytic cracking (FCC) unit.

The liquid hydrocarbon charges processed in refining units are generally brought into contact with a solid catalyst which will encourage the chemical reaction or reactions used to process the charge. In order to improve this contact and maximise the efficiency of the reactions, these liquid hydrocarbon charges are atomized into fine droplets by injection devices. This atomization makes it possible to maximise the area for contact between liquid (liquid hydrocarbon charge) and solid (catalyst), encouraging the transfer of heat and therefore encouraging the vaporisation of these hydrocarbons which react in the gaseous phase. Although there is no real consensus regarding the optimum diameter for the droplets, the desire is generally to form droplets the diameter of which is of the same order of magnitude is the diameter of the particles of catalyst, namely under 200 microns, for example of the order of 50 to 80 microns.

In general, use is made of injection devices referred to as "diphasic", which have a cylindrical hollow body and two inlet openings via which the liquid hydrocarbon charge and an atomizing gas, generally steam, are respectively injected into the said body. A contact chamber is formed inside the body, in which chamber the hydrocarbon charge and the atomizing gas are brought into contact in order to atomize the hydrocarbon charge. Once atomized, the hydrocarbon charge is ejected via an outlet opening that opens into the reactor. Each injection device is installed on a wall of the reactor so that one end of the injection device comprising the outlet opening is situated inside the reactor.

Impact-type injection devices are notably known, in which the charge is introduced radially and impinges on a target situated at the centre of the body, causing droplets to form. An atomizing gas circulating axially allows these droplets to be entrained, while being divided further, towards the outlet from the body. The phenomenon of target erosion may nevertheless be observed, notably when the charge that is to be injected contains particles, and this makes it necessary to reinforce the target, increasing the cost further.

In certain injection devices, additional atomizing gas may be injected into the body via a pipe surrounding the target: the atomizing gas then leaves at target level and impinges on the liquid introduced via the opening situated facing the target, encouraging atomization of the jet of liquid that it strikes head-on.

The mixing chamber of these injection devices with dual injection of atomizing gas is, nevertheless, complex and expensive to produce. It therefore has to be produced separately, and then secured to the hollow body of the injection device.

The invention seeks to at least partially alleviate the disadvantages mentioned hereinabove. Therefore, what is proposed is an injection device configured to atomize a liquid into droplets using a gas, comprising:

- a hollow tubular body extending in a longitudinal direction and an internal wall of which defines a first zone referred to as contact zone, and a second zone situated downstream of the first zone with respect to a direction in which the liquid and the gas circulate inside the body,
- a first gas introducing element for introducing a gas into the first zone in the longitudinal direction, the said gas introducing element being mounted on a first opening of the body, at one end of said body in the longitudinal direction,
- a second liquid introducing element for introducing a liquid into the first zone in a direction perpendicular to the longitudinal direction, mounted on a second opening of the body close to the first opening,
- an atomizing element mounted on a third opening of the body situated facing the second opening, and comprising:
  - a tubular pipe for conveying gas into the first zone, situated facing the liquid introducing element, and
  - a target situated at the centre of the pipe,
  - The pipe and the target extending in a direction perpendicular to the longitudinal direction, the target having an impact surface at one end of the pipe opening into the first zone, in alignment with the first gas introducing element,
- an end element comprising at least one outlet orifice for discharging the atomized liquid, mounted at one end of the body that is the opposite end (in the longitudinal direction) to the first gas inlet opening.

According to the invention, the body has an internal cross-section that varies continuously or is constant over its entire length and the internal wall of the body is provided, between the first and the second zone, with at least one chicane projecting from the internal wall towards the inside of the body.

In the usual way, a chicane is a device which impedes the passage of a moving fluid. The particular arrangement of the invention makes it possible to produce the body in a way that is very simple without detracting from the quality of atomization of the injection device.

The body has an internal cross-section that varies continuously, or in other words without any sudden variation and without any shoulder. The body may thus have a frustoconical or similar shape. For preference, the body has a constant internal cross-section. It may for example be a cylinder or the like.

The body may advantageously be made as a single piece. The end element may potentially be produced as one piece with the body.

In a first embodiment, the said at least one chicane may be configured so that, in each plane perpendicular to the longitudinal direction of the body containing the said chicane, the chicane extends over the entire periphery of the internal wall. The chicane or chicanes may thus be produced in a simple way. A chicane may then take the form of a simple ring. Advantageously, a single chicane may be provided. Such an arrangement may nevertheless give rise to a pressure drop, something which may prove problematical for processing heavy charges, which are increasingly used. Specifically, atomizing heavy charges involves a significant pressure drop at the injectors, this having the effect of increasing the pressure of the charge fed to the injectors. It is then necessary to use powerful and expensive pumps in order to achieve the desired injector-outlet pressures. It is therefore beneficial to limit the pressure drop brought about by the injection system. Depending on the configuration of the diphasic injection devices, it may also prove necessary to considerably increase the flow rate of atomizing gas in order to atomize heavy charges.

In order to overcome this disadvantage, in a second embodiment, the said at least one chicane may be configured so that, in each plane perpendicular to the longitudinal direction of the body containing the said chicane, the chicane extends over just part of the periphery of the internal wall.

Thus, in each plane perpendicular to the longitudinal direction of the body, each chicane reduces the through-area of the body on just part of its periphery so that the pressure drop is lower than the pressure drop that would arise if a chicane extended over the entire periphery of the internal wall.

What is meant by a through-area is the internal surface area of the body that is not occupied by an element and through which the fluid can circulate.

Advantageously, the said at least one chicane is configured in such a way that the orthogonal projection of the chicane onto a plane perpendicular to the longitudinal direction of the body extends over just part of the periphery of the internal wall in the said plane of projection. That makes it possible to reduce the pressure drop still further, despite the presence of (a) chicane(s). Note that when several chicanes are provided, their projections in one and the same orthogonal plane may overlap, or even extend over the entirety of the periphery of the internal wall.

As an alternative, or in combination, the said at least one chicane may be configured in such a way that the orthogonal projection of at least one chicane onto a plane perpendicular to the longitudinal direction of the body may extend over the entire periphery of the internal wall in the said plane of projection, possibly with overlap.

In the second embodiment, the said at least one chicane may define a wall one edge of which is secured to the internal wall along a segment of a curve, notably of a helicoidal curve.

As an alternative, whatever the embodiment, the said at least one chicane may define a wall one edge of which is secured to the internal wall along a line extending in a plane perpendicular to the longitudinal direction of the said body.

Whatever the embodiment, the said internal wall may be provided with a plurality of disjointed chicanes. That makes it easier for the fluids to mix without, however, increasing the pressure drop. In particular, these chicanes may be distributed, particularly uniformly, on the periphery of the internal wall for better mixing without an increase in the pressure drop.

The features hereinafter also make it possible to improve the mixing between the liquid and the gas without appreciably increasing the pressure drop.

Thus, when there are several chicanes present, each chicane may advantageously be spaced away from at least one other chicane in the longitudinal direction of the body.

In that case, the chicanes may then extend over a relatively short length of the body.

In the case of the second embodiment, when several spaced-apart chicanes are present, each chicane may also be angularly offset from the other chicanes by rotation about an axis parallel to or coincident with the said longitudinal direction. In particular, the orthogonal projection of the chicanes onto a plane perpendicular to the longitudinal direction of the body may extend over the entire periphery of the internal wall. In this plane of projection, there may be an overlap of the projections of the chicanes or, for preference, a juxtaposition thereof, the chicanes then being arranged in a staggered configuration.

Whatever the embodiment, the wall defined by each chicane may be a planar wall, which is simple to produce, or alternatively a curved wall.

Said at least one chicane may thus, on the side of the inlet openings, exhibit a curved face arranged so as to direct a fluid impinging on this face towards the inside of the body, which may make it possible to improve the mixing.

In particular, several chicanes having a curved face may be arranged relative to one another in such a way as to impart to the fluid impinging on the curved face thereof one and the same rotational movement about an axis parallel to the longitudinal direction of the body.

Whatever its shape (curved or planar), a chicane (or the tangent thereto at the point at which it meets the internal wall of the body) may define a predetermined angle with respect to a plane orthogonal to the longitudinal direction of the body. This angle may be variable for one and the same chicane.

Whatever the shape (curved or planar) of a chicane, its free edge (the edge opposite to its edge secured to the internal wall of the body) may have one or two faces of rounded or bevelled shape.

In general, the chicane or chicanes may have a height, measured perpendicular to the longitudinal direction of the body, that is non-zero. Advantageously, this height is equal to at most ½ the maximum internal dimension of the body perpendicular to the longitudinal direction of the body. For preference, this height is equal to at most ¼ of the maximum internal dimension of the body, or even $\frac{1}{8}^{th}$ of this maximum dimension, for example of the order of $\frac{1}{10}^{th}$ of this maximum dimension. This height may furthermore be variable for one and the same chicane.

In general, the chicane or chicanes may have a thickness, measured in the longitudinal direction of the body, that is non-zero. Advantageously, this thickness is at most 35 mm, preferably at most 31 mm, or even at most 20 mm or at most 16 mm. This thickness may for example be of the order of 10 mm.

The invention is now described with reference to the appended, non-limiting drawings, in which:

FIG. 1 is a schematic depiction in longitudinal section of an injection device according to one embodiment of the invention;

FIG. 2*a* is a view in section along the line AA of a chicane of FIG. 1, according to one embodiment;

FIGS. 2*b* and 2*c* are views in section along the lines AA and BB of FIG. 1, respectively, according to another embodiment;

FIG. 2*d* is an orthogonal projection in a plane perpendicular to the longitudinal direction X of the chicanes of the injection device of FIG. 1, according to an alternative form of embodiment;

FIG. 3 partially depicts a longitudinal section of an injection device according to another alternative form;

FIG. 4 partially depicts a perspective view of the open internal wall of an injection device according to another alternative form;

FIG. 5 depicts a view of several chicanes along the longitudinal axis X according to another alternative form;

FIG. 6 depicts a view along the longitudinal axis X according to another alternative form of one and the same chicane, and views in section in two distinct directions A'A and B'B which are perpendicular to the longitudinal direction;

Figure 7:
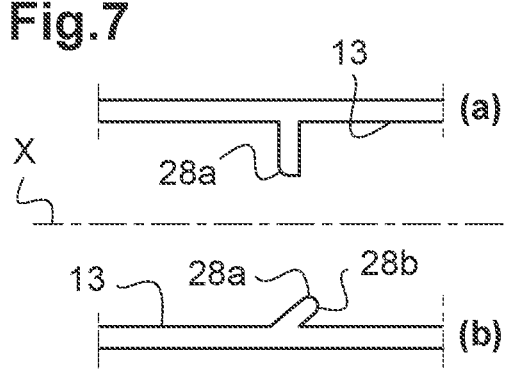
Figure 8:
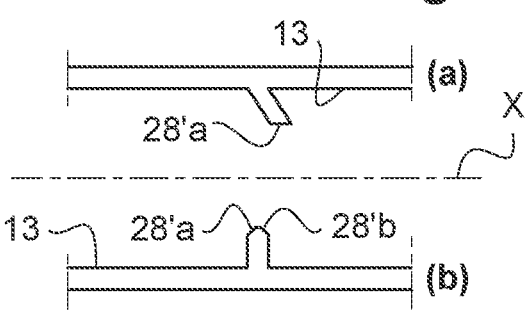

FIGS. 7 and 8 partially depict views in longitudinal section of chicanes having free edges of different shapes.

In the various figures, elements that are identical bear the same references.

Figure 1:
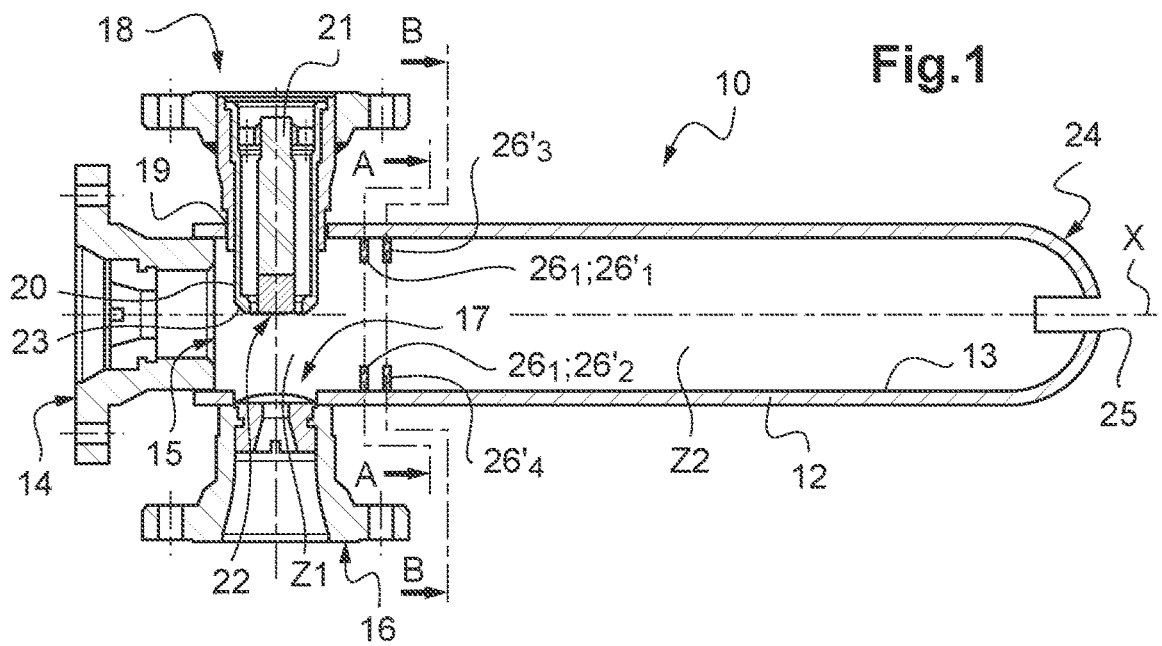
Figure 2A:
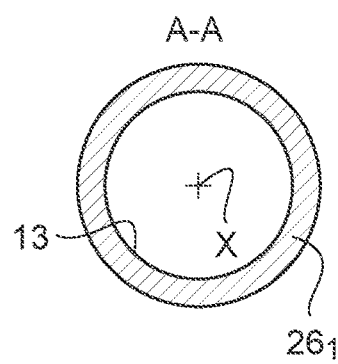
Figure 2B:
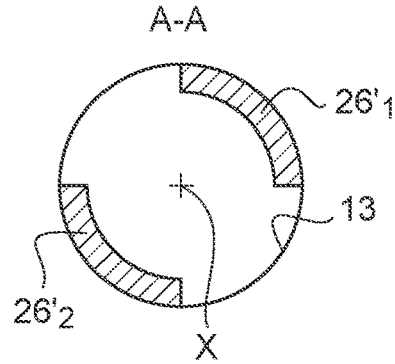
Figure 2C:
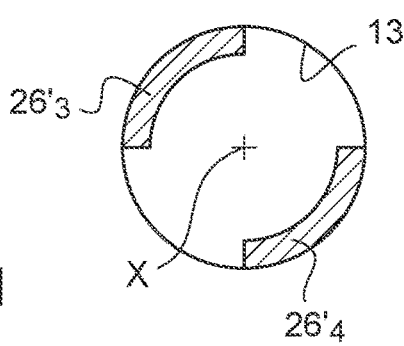
Figure 2D:
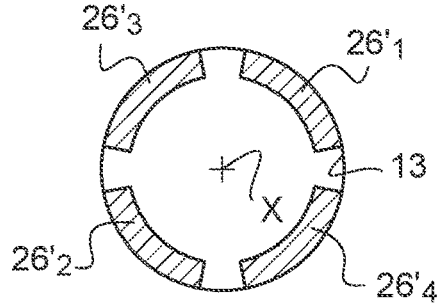

FIG. 1 schematically depicts an injection device 10 which has a hollow tubular body 12 which extends in a longitudinal direction X.

The body 12 comprises an internal wall 13 which defines a first zone Z1 referred to as contact zone, and a second zone Z2 situated downstream of the first zone Z1 with respect to a direction in which the liquid and the gas circulate inside the body (in this instance from left to right in FIG. 1).

The injection device 10 further comprises:
  a first gas introducing element 14 for introducing a gas into the first zone Z1 in the longitudinal direction X, this gas introducing element 14 being mounted on a first opening 15 of the body, at one end of said body in the longitudinal direction X,
  a second liquid introducing element 16 for introducing a liquid into the first zone Z1 in a direction perpendicular to the longitudinal direction X, mounted on a second opening 17 of the body close to the first opening 15,
  an atomizing element 18 mounted on a third opening 19 of the body situated facing the second opening 17, and comprising:
    a tubular pipe 20 for conveying gas into the first zone Z1, situated facing the liquid introducing element 16, and
    a target 21 situated at the centre of the pipe 20, the pipe 20 and the target 21 extending in a direction perpendicular to the longitudinal direction X, the target 21 having an impact surface 22 at one end 23 of the pipe opening into the first zone Z1, in alignment with the first gas introducing element 16,
  an end element 24 comprising at least one outlet orifice 25 for discharging the atomized liquid, mounted at one end of the body that is the opposite end to the first gas inlet opening 15.

The end element 25 is thus situated downstream of the zones Z1, Z2.

The openings 15, 17, 19 of the body 12 open into the first zone Z1, also referred to as contact chamber.

Inside the body 12, the fluids circulate from the inlet openings 15, 17, 19 towards the outlet orifice 25.

The injection device 10 depicted in FIG. 1 is commonly referred to as being of the "impact" type.

Here, the first zone Z1 and the second zone Z2 take the form of a straight internal pipe connecting the first inlet opening 15 the outlet orifice 25 in an axial direction of the said body. This internal pipe in this embodiment has a constant internal diameter. The invention is not, however, limited by this embodiment. The internal cross-section of this pipe (in other words of the body) could vary continuously or be constant over the entire length of the pipe (i.e. of the body), without, however, being circular.

In the embodiment depicted, the body 12 is a cylinder, in other words the internal wall 13 here is cylindrical, its axis coinciding with the longitudinal direction X of the body.

The liquid emanating from the introducing element 16 is sprayed against the impact surface 22 of the target 21 as soon as it enters the first zone Z1. The jet of liquid is broken open and carried in the form of droplets by a stream of atomizing gas introduced at high speed by the gas introducing element 14. Atomization of the liquid takes place in two stages. A first part of the atomization occurs at the target 21 as the jet of liquid impinges on the impact surface 22 of the target 21. The jet of liquid thus broken open undergoes shearing by the gas entering via the pipe 20 and by the gas introduced by the first gas introducing element 14. The second part of the atomization occurs at the reduced-diameter outlet orifice 25, where the narrowing in diameter accelerates the fluids.

According to the invention, the internal wall 13 of the body is also provided, between the first zone Z1 and the second zone Z2, with at least one chicane $\mathbf{26}_i$ (where i, the number of chicanes, is a non-zero whole number). Because this chicane locally reduces the diameter of the internal wall 13, it disrupts the movement of the fluid, encouraging mixing. In particular, the presence of a chicane makes it possible to avoid the formation of a film of liquid on the wall by bringing the liquid back into the axis of the stream of gas.

One or more chicanes may be provided.

The injection device 10 may thus comprise a single chicane $\mathbf{26}_1$, depicted in FIG. 2*a*, situated at the line of section A-A in FIG. 1. This chicane $\mathbf{26}_1$ takes the form of a solid ring extending over the entire periphery of the internal wall 13. Here, the chicane $\mathbf{26}_1$ defines a wall extending at right angles to the longitudinal direction X.

FIGS. 2 to 8 depict other embodiments which differ from those previously described in terms of the number and/or shape of the chicanes. In these figures, the chicanes are denoted by the reference "26" or "126", the suffix "i", which is a non-zero whole number, representing the number of chicanes, the symbols prime ('), double prime (") and triple prime (''') denoting embodiments that differ from those previously described.

FIGS. 2*b* and 2*c* are views in cross-section of chicanes according to another embodiment in which each chicane $\mathbf{26'}_i$ is configured so that, in each plane perpendicular to the longitudinal direction X of the body containing this chicane, the chicane extends over just part of the periphery of the internal wall.

In this example, four disjointed chicanes $\mathbf{26'}_1$, $\mathbf{26'}_2$, $\mathbf{26'}_3$, $\mathbf{26'}_4$ are provided.

It will be noted here that each chicane $\mathbf{26'}_1$, $\mathbf{26'}_2$, $\mathbf{26'}_3$, $\mathbf{26'}_4$ is configured in such a way that the orthogonal projection of the chicane onto a plane perpendicular to the longitudinal direction of the body extends over just part of the periphery of the internal wall in the said plane of projection (see FIGS. 2*b*, 2*c*). In other words, the view of this plane of projection is similar to that in FIG. 2*a*.

Two chicanes $\mathbf{26'}_1$, $\mathbf{26'}_2$ here extend in one and the same plane perpendicular to the longitudinal direction X, the other two chicanes $\mathbf{26'}_3$, $\mathbf{26'}_4$ extending in another perpendicular plane, spaced away from the plane of the chicanes in the longitudinal direction X (see FIG. 1). The invention is not restricted by this embodiment, one or more other chicanes being able to be in a distinct third plane perpendicular to the longitudinal direction X or in still other distinct planes. As an alternative or in combination, just one chicane could be provided at each specific position along the longitudinal direction X.

The chicanes $\mathbf{26'}_1$, $\mathbf{26'}_2$, $\mathbf{26'}_3$, $\mathbf{26'}_4$ are furthermore offset angularly by rotation about the longitudinal direction X, as visible in FIGS. 2*b* and 2*c*. It will be noted that the chicanes are in a staggered configuration, their orthogonal projection onto a plane perpendicular to the longitudinal direction of the body extending over the entire periphery of the internal wall 13.

As an alternative, provision could be made for the orthogonal projection of these chicanes $\mathbf{26'}_i$ onto a plane perpendicular to the direction X not to extend over the entire periphery of the internal wall 13 but to extend over just part, as depicted in FIG. 2*d*.

In another alternative form that has not been depicted, provision could be made for the orthogonal projection of the chicanes onto a plane perpendicular to the direction X to extend over the entire periphery of the internal wall 13, with the projections of the chicanes overlapping.

Thus, the relative layout of the chicanes may be chosen in such a way as to cause as much disruption as possible to the movement of the fluid circulating inside the injection device, without increasing the drop in pressure.

In the example depicted in FIG. 1, the chicanes take the form of planar walls perpendicular to the longitudinal direction X. In other words, one edge of the wall of each chicane is thus secured to the internal wall 13 along a line extending in a plane perpendicular to the longitudinal direction of the said body.

The chicanes depicted in FIGS. 1 and 2a-2d define planar walls perpendicular to the longitudinal direction X. These walls could also be curved. Thus, FIG. 3 is a partial depiction in axial section of the injection device 10 provided with chicanes $26''_1$, $26''_2$ that are curved, notably in the direction of the central longitudinal axis of the body 12. Here, the concavity of these chicanes is orientated towards the outlet orifice 25. Nevertheless, provision could be made for it to be orientated in the opposite direction.

In this embodiment, each chicane $26''_1$, $26''_2$ defines a wall, one edge of which is secured to the internal wall 13 along a line extending in a plane perpendicular to the longitudinal direction X. Although not depicted, other chicanes $26''_i$ spaced apart in the X-direction and/or angularly offset from one another could be provided.

FIG. 4 is a partial perspective depiction of the wall 13 of an injection device 10 comprising a chicane $26''_1$ which defines a wall, one edge of which is secured to the internal wall 13 along a segment of a helicoidal curve H. The chicane $26'''_1$ may define a planar or curved wall, as depicted in FIG. 3.

One or more chicanes $26'''_i$ may be provided, these for example being angularly offset and/or spaced apart in the longitudinal direction X. furthermore, they may be arranged relative to one another in such a way as to impart to the fluid impinging on the curved face thereof one and the same rotational movement about an axis parallel to the longitudinal direction of the body.

The chicanes described hereinabove may be produced as one piece with the body 12, for example by moulding or machining, or may be added-on elements which are fixed, for example welded, held between flanges, or the like. When several chicanes are present, they may be identical or different, it being possible to combine the various shapes and arrangements of chicanes described hereinabove.

The chicane or chicanes are arranged between the first and second zones Z1, Z2. Typically, the second zone has a length (in the longitudinal direction X) 2 to 10 times greater than the length of the first zone. The chicane or chicanes, notably the first chicane, may be situated at a distance "l" from the axis of the target 20 or of the openings 17, 19 that is less than the diameter of the internal wall 13, at the level of the first zone, for example at a distance corresponding to ¾ of this diameter (for the sake of clarity, the figures are not drawn to scale).

The chicane or chicanes may have a radial dimension or height (perpendicular to the longitudinal direction X) that is relatively small, for example less than $1/8^{th}$ of the diameter of the internal wall 13, or even of the order of $1/10^{th}$ of this diameter. This height may be variable along the length of a chicane, as depicted in FIG. 5, in which four chicanes $126_1$, $126_2$, $126_3$, $126_4$ are depicted, with their height varying at the ends.

The non-zero thickness of each chicane, measured in the longitudinal direction X of the body is, for example, at most 16 to 35 mm.

It will be noted that, whatever its shape (curved or planar), a chicane (or the tangent thereto at the point at which it meets the internal wall 13 of the body) may define a predetermined angle with respect to a plane orthogonal to the longitudinal direction of the body (see FIGS. 3, 6, 7(b) and 8(a)). This angle may be variable for one and the same chicane 126', as visible in FIG. 6.

The chicane or chicanes inclined in this way may be inclined in the direction of the outlet orifice 25.

Whatever its shape (curved or planar), the free edge of a chicane (the opposite edge to the edge secured to the internal wall of the body) may have a face 28a of rounded shape (FIG. 7(a)), a face 28'a that is bevelled (FIG. 7(b)), two faces 28a, 28b with a rounded shape (FIG. 8a)) or two faces 28'a, 28'b with a bevelled shape (FIG. 8(b)).

When just one face is provided, it is preferably situated on the side of the mixing zone Z1 in the longitudinal direction X.

The various embodiments described hereinabove may be combined and implemented with equal preference for one or more chicanes.

The invention claimed is:

1. An injection device configured to atomize a liquid into droplets using a gas, comprising a hollow tubular body extending in a longitudinal direction (X) and of which an internal wall defines a first zone referred to as contact zone (Z1) and a second zone (Z2) situated downstream of the first zone with respect to a direction in which the liquid and the gas circulate inside the body, a first gas introducing element for introducing a gas into the first zone (Z1) in the longitudinal direction, the said gas introducing element being mounted on a first opening of the body, at one end of said body in the longitudinal direction, a second liquid introducing element for introducing a liquid into the first zone (Z1) in a direction perpendicular to the longitudinal direction, mounted on a second opening of the body, an atomizing element mounted on a third opening of the body situated facing the second opening, and comprising:

a tubular pipe for conveying gas into the first zone (Z1), situated facing the liquid introducing element, and a target situated at the center of the pipe, the pipe and the target extending in a direction perpendicular to the longitudinal direction, the target having an impact surface at one end of the pipe opening into the first zone (Z1), in alignment with the first gas introducing element, an end element comprising at least one outlet orifice for discharging the atomized liquid, mounted at one end of the body that is the opposite end to the first gas inlet opening, characterized in that the body has an internal cross-section that varies continuously or is constant over its entire length and in that its internal wall is provided, between the first and the second zone, with at least one chicane projecting from the internal wall towards the inside of the body, wherein the at least one chicane has a curved wall with a concavity of the one or more chicanes oriented toward the outlet orifice.

2. The injection device of claim 1, characterized in that the said at least one chicane is configured so that, in each plane perpendicular to the longitudinal direction of the body containing the said chicane, the chicane extends over the entire periphery of the internal wall.

3. The injection device of claim 1, characterized in that the said at least one chicane is configured so that, in each plane perpendicular to the longitudinal direction of the body containing the said chicane, the chicane extends over just part of the periphery of the internal wall.

4. The injection device of claim 2, characterized in that the said at least one chicane is selected from:
- a chicane configured in such a way that the orthogonal projection of the chicane onto a plane perpendicular to the longitudinal direction of the body extends over just part of the periphery of the internal wall in the said plane of projection
- a chicane configured in such a way that the orthogonal projection of the chicane onto a plane perpendicular to the longitudinal direction of the body extends over the entire periphery of the internal wall in the said plane of projection.

5. The injection device of claim 3, characterized in that the said at least one chicane defines a wall one edge of which is secured to the internal wall along a segment of a curve.

6. The injection device of claim 1, characterized in that the said at least one chicane defines a wall one edge of which is secured to the internal wall along a line extending in a plane perpendicular to the longitudinal direction of the said body.

7. The injection device of claim 1, characterized in that the said internal wall is provided with a plurality of disjointed chicanes.

8. The injection device of claim 7, characterized in that at least one chicane is spaced away from at least one other chicane in the longitudinal direction of the body.

9. The injection device of claim 7, characterized in that each chicane is angularly offset from the other chicanes by rotation about an axis parallel to or coincident with the said longitudinal direction (X).

10. The injection device of claim 9, characterized in that the orthogonal projection of the chicanes onto a plane perpendicular to the longitudinal direction of the body extends over the entire periphery of the internal wall, with the projections overlapping or being juxtaposed.

11. The injection device of claim 1, characterized in that the chicane or chicanes have a height, measured perpendicular to the longitudinal direction of the body, that is non-zero and equal to at most ½ of the maximum internal dimension of the body perpendicular to the longitudinal direction of the body.

12. The injection device of claim 1, wherein at least one of chicanes has a height that varies over a length of the chicane.

13. The injection device of claim 1, wherein the closest chicane to the target is at a distance "1" from the target, wherein 1 is less than a diameter of the internal wall.

14. The injection device of claim 13, wherein 1 is ¾ of the diameter.

15. The injection device of claim 1, wherein the chicane includes a free edge, the free edge opposite an edge secured to the internal wall, the free edge having a rounded face.

16. The injection device of claim 1, wherein the chicane includes a free edge, the free edge opposite an edge secured to the internal wall, the free edge having a bevelled face.

* * * * *